May 16, 1939.  R. SYBENGA  2,158,766
MEAT TENDERER
Filed Feb. 14, 1938  2 Sheets-Sheet 1
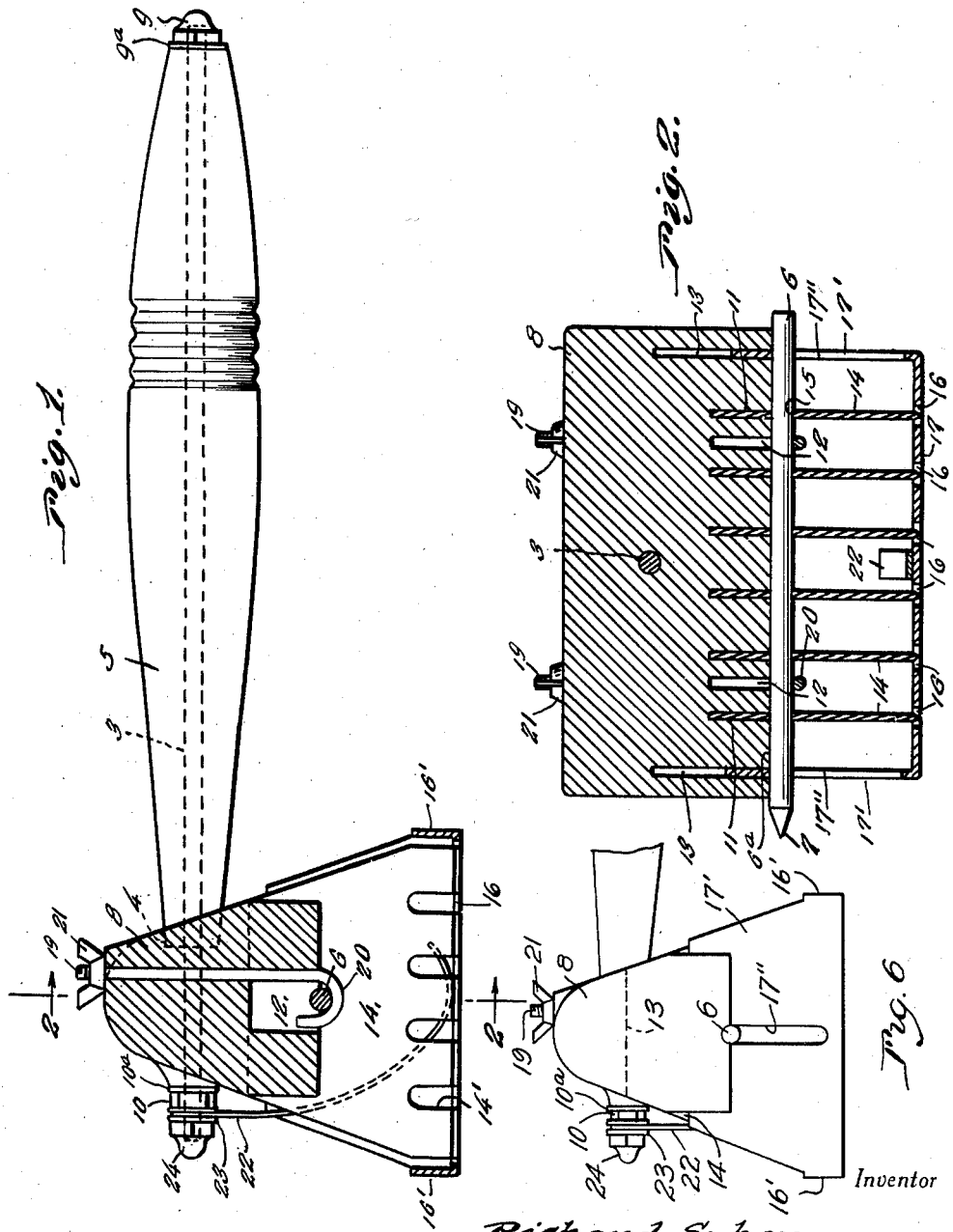
Inventor
Richard Sybenga
By Clarence A. O'Brien
Hyman Berman
Attorneys

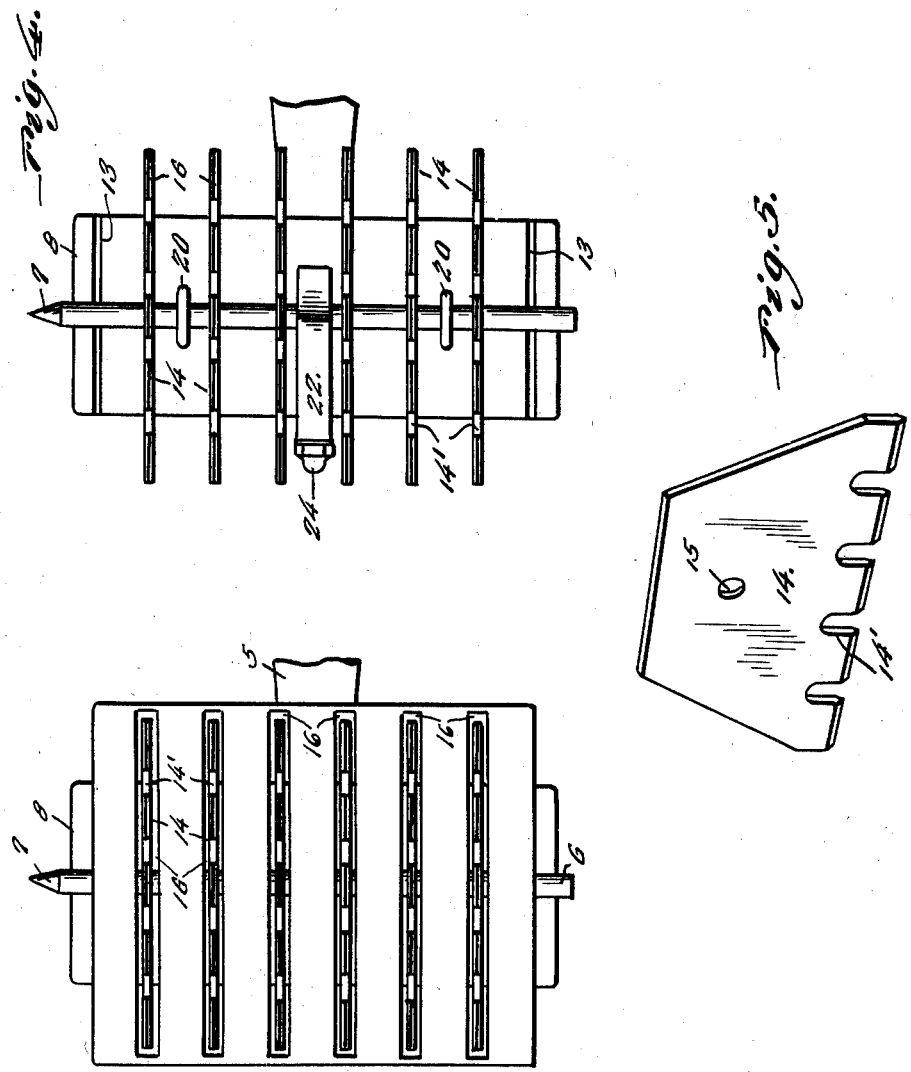

Patented May 16, 1939

2,158,766

UNITED STATES PATENT OFFICE 2,158,766

MEAT TENDERER

Richard Sybenga, Davenport, Iowa, assignor of one-half to Clair A. Olsen, Davenport, Iowa Application February 14, 1938, Serial No. 190,505

3 Claims. (Cl. 17—30)

My invention relates to improvements in meat tenderers for treating meat, particularly steaks, chops and the like.

The invention is directed primarily toward providing a combined lacerating and pounding implement, of the mallet type, embodying an assembly of cutting blades and a combined pounding and blade stripping member constructed and arranged for conjoint operation to render the meat tender without impairing the flavor thereof, as for instance by squeezing the blood out of the meat, and particularly designed for quick and easy disassembly of all parts for cleaning and sterilizing.

Another object is to provide a device of the character and for the purpose above set forth embodying a combined pounding and stripping member adapted to yield under the impact of blows delivered by the device to thereby prevent injury to the meat as for instance by distortion thereof.

Still another object is to provide a single key member for securing the blade assembly and the combined pounding and stripping member in proper relation and adapted for ready removal to permit disassembly of the said blades and member.

To the accomplishment of the above, and subordinate objects presently appearing, a preferred embodiment of my invention has been illustrated in the accompanying drawings, treated in detail in the succeeding description and defined in the claims appended hereto.

In the drawings:

Figure 1 is a view partly in side elevation and partly in section of a meat tenderer embodying my improvement, Figure 2 is a view in vertical transverse section taken on the line 2—2 of Figure 1 looking in the direction indicated by the arrows, Figure 3 is a fragmentary view in bottom plan, Figure 4 is a similar view, with the combined pounding and stripping member removed, Figure 5 is a view in perspective of one of the blades, and Figure 6 is a slightly reduced fragmentary view in side elevation.

Referring to the drawings by numerals, in the illustrated embodiment of my invention the tenderer thereof comprises as its basic element a bar-like handle 5, preferably cylindrical and of wood, and an elongated, preferably metal, head 8 detachably secured cross-wise to one end of said handle, the head being transversely rounded on top and flat on the bottom thereof. The head 8 is secured to the handle 5 by means of a socket 4 in one side of said head into which said end of the handle 5 is fitted, and a rod 3 extending through the handle 5 axially thereof and also through said head 8, said rod having nuts 9 and 10 threaded onto opposite ends thereof, respectively, with a pair of washers 9a and 10a interposed between said nuts and the handle and head respectively.

The head 8 has detachably mounted thereon a blade assembly and a combined pounding and stripping member as follows: Said head 8 is provided with a pair of transverse end slots, or recesses, 13 therein extending inwardly from the bottom thereof adjacent its opposite ends, respectively, a plurality of similar intermediate shallower slots 11, the slots 13 and 11 being spaced apart substantially equidistantly, and a pair of slots 12 similar to slots 11 adjacent each end slot 11. The purpose of the described slots will presently appear. The bottom of the head 8 has formed therein a longitudinally extending central groove 6a. The blade assembly comprises a plurality of cutting blades 14 of trapezoidal shape with notched cutting edges 14' and having the upper edges thereof seating in the slots 11. The combined pounding and stripping member 17 comprises a flat bottomed grid-like element provided with right angled upturned tapering ends 17' slidably fitting in the end slots 13, respectively, transverse slots 16 in said bottom adapted to permit the passage of the blades 14 therethrough and to clear the same, and right-angled upturned side flanges 16' upon opposite side edges of said blades respectively.

The cutting blades 14 and member 17 are secured to the head 8 by means of the following devices: A pair of bolts 19 having lower hooked ends 20 opposed to the groove 6a are slidably mounted in the head to extend downwardly through the same in the planes of the slots 12, respectively, for adjustment to move the hooked ends 20 toward and from said groove. Wing nuts 21 are provided on the upper ends of the bolts 19 for adjusting the same. The hooked ends 20 of said bolts 19 are designed to clamp a pin 6 in the groove 6a, said ends in this relation of the parts extending into the slots 12, whereby said bolts are maintained in proper relation for the insertion of the pin therethrough. The pin 6 extends through an aperture 15 in each blade 14, whereby the latter are held seated in the slots 11. The opposite ends of the pin 6 extend through vertical slots 17" in the ends 17' of the member 17, the arrangement being such that normally the member 17 will gravitate on the pin 6 and relative to the blades 14 until the bottom thereof extends flush with the cutting edges 14' of said blades, whereby the latter will be scraped clean of deposits thereon by the edges of the slots 16. As will be obvious, under the impact of blows against the meat, the member 17 will rebound upwardly in the slots 13, thereby preventing mashing the meat and obviating forcing the blood out of the same. Also, as will be clear, the member 17 is free to oscillate on the pin 6 to accommodate the bottom thereof to uneven surfaces on the meat.

The member 17 is tensioned against both rebound and oscillation by means of a leaf spring 22 extending from the head end of the rod 3 and having a curved lower end bearing on the bottom of the member 17 to urge the latter cutwardly of the head. The spring 22 is secured on the rod 3 by means of a washer 23 and nut 24. The pin 6 is preferably pointed at one end as at 7 to facilitate its insertion through the slots 17'', apertures 15 and hooked ends 20.

As will now be seen, by loosening the nuts 21 the pin 6 may be withdrawn, whereupon all the blades 14 and the member 17 will drop out of the head 8. Thus the parts are quickly disassembled when desired. Also by merely positioning the blades 14 and member 17 in their respective slots and inserting the pin 6 and tightening the nut 21 the parts may be securely and quickly assembled together.

The foregoing will, it is believed, suffice to impart a clear understanding of my invention without further explanation.

Manifestly the invention as described is susceptible of modification without departing from the inventive concept and right is herein reserved to all such modifications falling within the scope of the subjoined claims.

What I claim is:

1. A device of the class described comprising a handle, an elongated head secured to the handle crosswise, a plurality of cutting blades set into the bottom of the said head edgewise to extend transversely thereof and spaced apart longitudinally of the head, a combined pounding and stripping member including a flat grid-like plate fitting over said blades and having right-angled ends slidably mounted in the head whereby the member is movable independently of the blades under the impact of blows delivered by the device to strip the blades, and means to secure said blades and member to the head comprising a pair of bolts extending downwardly through the head adjacent opposite ends thereof, respectively, and having hooked lower ends adapted to be drawn inwardly of the head, and a removable pin extending through said ends of the member and through said blades and hooked ends of the bolts, said blades and ends of the member being apertured for projection of the pin therethrough, the apertures in the ends of said member being elongated to provide for such sliding of said ends and independent movement of the member.

2. A device of the class described comprising a handle, an elongated head secured to the handle crosswise, a plurality of cutting blades set into the bottom of the said head edgewise to extend transversely thereof and spaced apart longitudinally of the head, a combined pounding and stripping member including a flat grid-like plate fitting over said blades and having right-angled ends slidably mounted in the head whereby the member is movable independently of the blades under the impact of blows delivered by the device to strip the blades, means to secure said blades and member to the head comprising a pair of bolts extending downwardly through the head adjacent opposite ends thereof, respectively, and having hooked lower ends adapted to be drawn inwardly of the head, and a removable pin extending through said ends of the member and through said blades and hooked ends of the bolts, said blades and ends of the member being apertured for projection of the pin therethrough, the apertures in the ends of said member being elongated to provide for such sliding of said ends and independent movement of the member, and means to tension said member against independent movement comprising a leaf spring extending from the head and bearing against said plate.

3. A device of the class described comprising a handle, an elongated head secured to the handle crosswise, a plurality of cutting blades set into the bottom of said head edgewise to extend transversely thereof and spaced apart longitudinally of the head, and means to secure said blades to said head comprising a pair of bolts extending downwardly through said head adjacent opposite ends thereof, respectively, and having hooked ends adapted to be drawn inwardly of the bottom of the head, and a removable pin extending through said hooked ends of the bolts and through said blades, said head being provided in the bottom thereof with a longitudinally extending groove adapted to seat said pin.

RICHARD SYBENGA.